United States Patent
Kukreja et al.

(10) Patent No.: US 11,245,682 B2
(45) Date of Patent: Feb. 8, 2022

(54) ADAPTIVE AUTHORIZATION USING ACCESS TOKEN

(71) Applicant: Oracle International Corporation, Redwood Shores, CA (US)

(72) Inventors: Chuni Lal Kukreja, Delhi (IN); Aarathi Balakrishnan, Bangalore (IN); Deepak Ramakrishnan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 296 days.

(21) Appl. No.: 16/286,366

(22) Filed: Feb. 26, 2019

(65) Prior Publication Data

US 2020/0127994 A1    Apr. 23, 2020

(30) Foreign Application Priority Data

Oct. 18, 2018  (IN) .............................. 201841039499

(51) Int. Cl.
*H04L 29/06* (2006.01)
*G06F 21/31* (2013.01)

(52) U.S. Cl.
CPC .......... *H04L 63/0807* (2013.01); *G06F 21/31* (2013.01); *H04L 63/10* (2013.01); *H04L 63/20* (2013.01)

(58) Field of Classification Search
CPC ..... H04L 63/0807; H04L 63/10; H04L 63/20; G06F 21/31
See application file for complete search history.

(56) References Cited

U.S. PATENT DOCUMENTS

| 7,010,600 B1 * | 3/2006 | Prasad ................ H04L 63/0815 709/223 |
| 7,685,206 B1 * | 3/2010 | Mathew ................ H04L 63/105 707/785 |
| 2014/0075568 A1 * | 3/2014 | Sathyadevan ....... G06F 21/6218 726/27 |

(Continued)

OTHER PUBLICATIONS

Jason Crampton, Specifying and Enforcing Constraints in Role-Based Access Control, 2003, ACM, pp. 43-50. (Year: 2003).*

(Continued)

*Primary Examiner* — Luu T Pham
*Assistant Examiner* — Fahimeh Mohammadi
(74) *Attorney, Agent, or Firm* — Kilpatrick Townsend & Stockton LLP

(57) ABSTRACT

Techniques for described for generating and using rule-enhanced access tokens in connection with authorization for access to resources. An access token is generated in response to determining that a user is authorized to access a protected resource. The access token contains rule information including one or more constraints, each constraint corresponding to a condition for granting or denying access to the protected resource. Upon receiving the access token, a client application can present the access token for accessing the protected resource. The client application can be configured to enforce one or more rules represented in the rule information. The client application can, for example, determine based on the one or more constraints that a condition for granting access is unmet and, in response, cancel a pending access request for the protected resource.

16 Claims, 9 Drawing Sheets

(56) References Cited

U.S. PATENT DOCUMENTS

| | | | | |
|---|---|---|---|---|
| 2014/0123312 A1* | 5/2014 | Marcotte | ............... | G06F 21/33 |
| | | | | 726/28 |
| 2014/0149741 A1* | 5/2014 | Balakrishnan | ........ | G06F 21/335 |
| | | | | 713/159 |
| 2014/0230023 A1* | 8/2014 | Parks | ..................... | H04L 63/08 |
| | | | | 726/4 |
| 2015/0089622 A1* | 3/2015 | Sondhi | .................. | H04L 63/20 |
| | | | | 726/9 |
| 2015/0172283 A1* | 6/2015 | Omnes | ................. | H04W 12/08 |
| | | | | 726/9 |
| 2015/0326578 A1* | 11/2015 | Hsu | ........................ | H04L 63/10 |
| | | | | 726/9 |
| 2016/0028737 A1* | 1/2016 | Srinivasan | ............ | H04L 63/102 |
| | | | | 726/1 |
| 2016/0359861 A1* | 12/2016 | Manov | ................. | H04L 63/102 |
| 2016/0366183 A1* | 12/2016 | Smith | .................. | H04L 63/101 |
| 2017/0034152 A1* | 2/2017 | Subramanya | ....... | H04L 63/0815 |
| 2017/0163635 A1* | 6/2017 | Hirata | ................ | H04L 63/0807 |
| 2017/0328857 A1* | 11/2017 | Shah | ................. | A61B 5/14532 |
| 2019/0372993 A1* | 12/2019 | Dunjic | ................. | H04L 9/0869 |

OTHER PUBLICATIONS

Ehood Porat et al., Authorization Enforcement Detection, Jun. 2017, ACM, pp. 179-182. (Year: 2017).*
Ramasubramanian P et al., An Active Rule Based Approach to Database Security in E-Commerce Systems using Temporal Constraints, Oct. 15-17, 2003, IEEE, pp. 1148-1152. (Year: 2003).*
P.A. Bonatti et al., A Rule-Based Trust Negotiation System, Nov. 2010, IEEE, vol. 22, Issue: 11, pp. 1507-1520. (Year: 2010).*
Hardt, The OAuth 2.0 Authorization Framework, Internet Engineering Task Force (IETF) RFC 6749, Oct. 2012, pp. 1-76 (Retrieved from the internet <URL: https://tools.ietf.org/html/rfc6749>).

* cited by examiner

```
                                    300

{
                                    ......
                                    "authz_rule":{

"time_of_day":{
                              310   "start_time": "06:00",
                                    "end_time": "18:00"
                                    }

"location":[
                              320   "India",
                                    "US",
                                    "China"
                                    ], "group": "hr",
                              330
                                    "ip_range":{

"disallowed":[
                              332   "10.0.9.*",
                                    "10.1.1.*"
                                    ]

"allowed":[
                              334   "*"
                                    ]
                                    }, "exp": 1530763807
                              340   }
                                    }
```

FIG. 3

ADAPTIVE AUTHORIZATION USING ACCESS TOKEN

CROSS-REFERENCES TO RELATED APPLICATIONS

The present application claims the benefit and priority of Indian Provisional Application No. 201841039499, filed Oct. 18, 2018, entitled "ADAPTIVE AUTHORIZATION USING ACCESS TOKEN". The content of Indian Provisional Application No. 201841039499 is incorporated herein by reference in its entirety for all purposes.

BACKGROUND

Authentication and authorization are sometimes required for accessing resources in a computing environment. Many enterprise customers prefer to use a cloud-based identity server (e.g., a server running Identity Cloud Services (IDCS) software from Oracle Corporation®) for performing authentication and authorization in connection with access to resources by client applications such as Web and mobile applications. Authentication is sometimes performed according to the OpenID Connect (OIDC) protocol, which is a layer on top of the Open Authorization 2 (OAuth 2) protocol. Some cloud-based identity servers can be configured to apply rules for determining access to protected resources. However, such rules are not enforced in connection with generating an access token through an authorization procedure. If authorization is performed according to the OAuth 2 protocol, OAuth access tokens are checked for authenticity based on the existence of a valid digital signature from a token issuing authority and also checked for token validity. The OAuth 2 specification, as defined in Request For Comments (RFC) 6749, does not support rule enforcement. Therefore, the entity that performs token validation (e.g., a resource server hosting a resource to be accessed) does not enforce access rules.

Additionally, access rules cannot be directly enforced by client applications. Instead, if a client application needs to enforce these rules, the client application must make a backchannel request to the identity server, which will evaluate the backchannel request based on the rules and return an appropriate response. A problem with this server-oriented approach is that even though the identity server may have generated an access token for a user of the client application and for a set of defined scopes, the client application still has to make this backchannel request every time the user requests access to a protected resource for which the access token needs to be presented.

BRIEF SUMMARY

The present disclosure relates generally to enforcing rules in connection with authorization for access to resources. More particularly, techniques are described for generating a rule-enhanced access token for use by a token receiving entity (e.g., a client application or a WebGate operating as a single sign-on (SSO) agent), where the access token contains rule information that enables the token receiving entity to determine and enforce one or more rules. In this way, rules can be enforced without making a trip to an identity server every time access to a resource is requested by a client application. Various inventive embodiments are described herein, including methods, systems, non-transitory computer-readable storage media storing programs, code, or instructions executable by one or more processors, and the like.

In certain embodiments, a rule-enhanced access token comprises one or more constraints, each constraint corresponding to a condition for granting or denying access. For example, the constraints in the access token may correspond to one or more of the following conditions: a time during which access is allowed, a time during which access is denied, a user or user group that is allowed access, a user or user group that is denied access, an Internet Protocol (IP) address that is allowed access, an IP address that is denied access, a geographic location that is allowed access, and a geographic location that is denied access. Thus, the constraints represent access rules.

A constraint can be specified in any number of ways including, for example, in the form of machine-readable code embedded within the access token or as a parameter value (e.g., a text string or a number) that is inserted into a designated location within the access token and parsed to determine the corresponding condition.

In certain embodiments, a token receiving entity may be configured to request a new access token in response to determining that an existing access token is no longer valid (e.g., expired) or in response to determining that the constraints contained in the existing access token are no longer valid. This enables the token receiving entity to receive any updates that may have been configured for the constraints. For example, the rules may be based on a policy defined by an authorization engine of an access management (AM) server that operates as the token issuing authority. If the policy is modified, then the constraints may be updated on the server side. The request for the new access token allows the updated constraints to be propagated to the token receiving entity. Once the access token or the constraints/rules in the access token are determined to be invalid (e.g., expired), the access token can be regenerated, for example, by using a refresh token or a JWT (JavaScript Object Notation (JSON) Web Token) authorization grant flow, which is a two-legged flow in which the token receiving entity directly communicates with the token issuing authority. Alternatively, a new access token can be obtained through a three-legged flow, for example, an authorization code grant flow in which a Web browser contacts the token issuing authority on behalf of the token receiving entity.

In certain embodiments, a method includes receiving, by an access management system (AMS or AM system), an access token request from a client application, the access token request identifying a user and a resource to be accessed. The method further includes determining, by the AMS, that the user is authorized to access the resource; and generating, by the AMS, a first access token in response to the determining that the user is authorized to access the resource. The first access token includes one or more constraints, each constraint corresponding to a condition for granting or denying access to the resource. The method further includes sending, by the AMS, the first access token to the client application. The first access token is presentable in an access request for obtaining access to the resource. The one or more constraints are read from the first access token to determine whether to proceed with the access request.

The foregoing, together with other features and embodiments will become more apparent upon referring to the following specification, claims, and accompanying drawings.

BRIEF DESCRIPTION OF THE DRAWINGS

FIG. 3 shows an example of rule information that can be added to an access token, according to certain embodiments.

DETAILED DESCRIPTION

Figure 1:
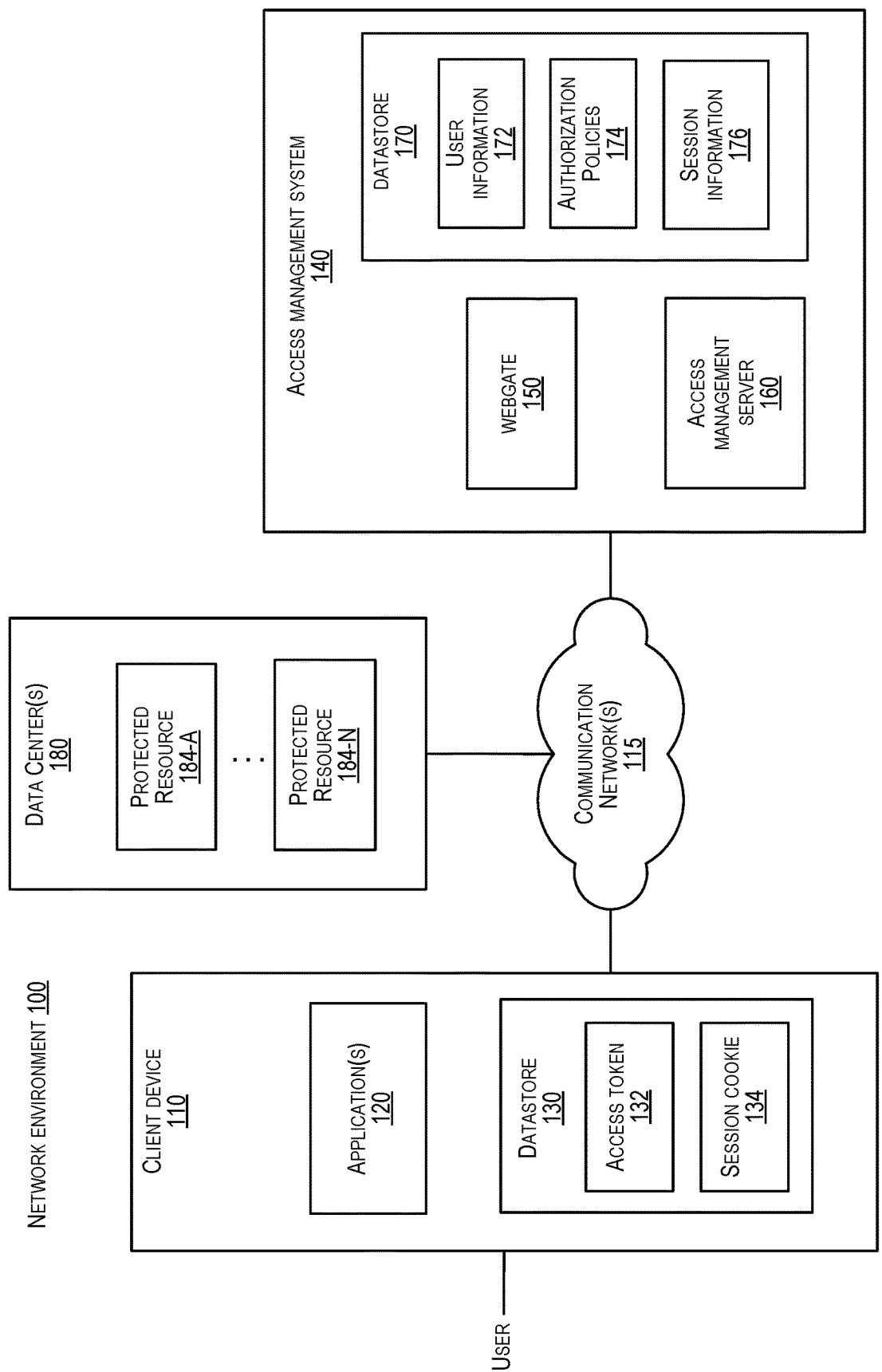
FIG. 1 is a simplified block diagram of a networked computing environment incorporating an exemplary embodiment.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to enforcing rules in connection with authorization for access to resources. More particularly, techniques are described for generating a rule-enhanced access token for use by a token receiving entity (e.g., a client application or a WebGate operating as a single sign-on (SSO) agent), where the access token contains rule information that enables the token receiving entity to determine and enforce one or more rules. In this way, rules can be enforced without making a trip to an identity server every time access to a resource is requested by a client application. Various inventive embodiments are described herein, including methods, systems, non-transitory computer-readable storage media storing programs, code, or instructions executable by one or more processors, and the like.

In certain embodiments, a rule-enhanced access token comprises one or more constraints, each constraint corresponding to a condition for granting or denying access. For example, the constraints in the access token may correspond to one or more of the following conditions: a time during which access is allowed, a time during which access is denied, a user or user group that is allowed access, a user or user group that is denied access, an Internet Protocol (IP) address that is allowed access, an IP address that is denied access, a geographic location that is allowed access, and a geographic location that is denied access. Thus, the constraints represent access rules.

A constraint can be specified in any number of ways including, for example, in the form of machine-readable code embedded within the access token or as a parameter value (e.g., a text string or a number) that is inserted into a designated location within the access token and parsed to determine the corresponding condition.

In certain embodiments, a token receiving entity may be configured to request a new access token in response to determining that an existing access token is no longer valid (e.g., expired) or in response to determining that the constraints contained in the existing access token are no longer valid. This enables the token receiving entity to receive any updates that may have been configured for the constraints. For example, the rules may be based on a policy defined by an authorization engine of an access management (AM) server that operates as the token issuing authority. If the policy is modified, then the constraints may be updated on the server side. The request for the new access token allows the updated constraints to be propagated to the token receiving entity. Once the access token or the constraints/rules in the access token are determined to be invalid (e.g., expired), the access token can be regenerated by using a refresh token or a JWT (JavaScript Object Notation (JSON) Web Token) authorization grant flow, which is a two-legged flow in which the token receiving entity directly communicates with the token issuing authority. Alternatively, a new access token can be obtained through a three-legged flow, for example, an authorization code grant flow in which a Web browser contacts the token issuing authority on behalf of the token receiving entity.

For purposes of this application, an access token is any token that is presentable for obtaining access to a protected resource. For example, an access token can be an OAuth access token generated during an authorization procedure that is based on an OAuth protocol. Resources that are the subject of an access request may include any item managed and/or stored by one or more resource hosting entities (e.g., data centers) and available for access by one or more users. Such items include files (such as documents, spreadsheets, and images), computational resources (such as processing power, cloud storage, and network communication bandwidth), software applications, and/or the like. A resource may be protected or unprotected. If a resource is protected, a user may need to be authenticated and authorized in order to access the resource.

In certain embodiments, access requests may be sent during a session created for a user in response to successful authentication of the user. While the session remains valid, the user may request resources without having to re-authenticate. In some embodiments, a session can be an SSO session. An SSO session permits a user to authenticate once and then access protected resources hosted by different entities in a computing system without having to re-authenticate for the duration of the SSO session.

FIG. 1 is a simplified block diagram of a network environment 100 incorporating an exemplary embodiment. Network environment 100 may comprise multiple computer systems communicatively coupled to each other via one or more communication networks 115. The systems in FIG. 1 include one or more client devices 110, one or more data centers 180, and an AM system 140 communicatively coupled to each other via communication network(s) 115. Network environment 100 depicted in FIG. 1 is merely an example and is not intended to unduly limit the scope of claimed embodiments. One of ordinary skill in the art would recognize many possible variations, alternatives, and modifications. For example, in some implementations, network environment 100 may have more or fewer systems or components than those shown in FIG. 1, may combine two or more systems, or may have a different configuration or arrangement of systems.

Communication network 115 facilitates communications between the various systems and devices depicted in FIG. 1. Communication network 115 can be of various types and can include one or more communication networks. Examples of communication network 115 include, without restriction, the Internet, a wide area network (WAN), a local area network (LAN), an Ethernet network, a public or private network, a wired network, a wireless network, and the like, and combinations thereof. Different communication protocols may be used to facilitate the communications, including both wired and wireless protocols such as the Institute of Electrical and Electronics (IEEE) 802.XX suite of protocols, TCP/IP, IPX, SAN, AppleTalk®, Bluetooth®, and other protocols. In general, communication network 115 may include any infrastructure that facilitates communications between the various systems depicted in FIG. 1.

Each of the systems and computing devices in FIG. 1 may include a data processing component (e.g., one or more processors) and one or more memory resources (e.g., volatile and/or non-volatile memory). Processors may include single or multicore processors. Processors may include general purpose microprocessors such as ones provided by Intel®, AMD®, ARM®, Freescale Semiconductor, Inc., and the like, that operate under the control of software stored in associated memory. Memory resources may be provided for storing instructions and/or data associated with an operating system and applications or processes executed by the processors. For convenience, memory resources are depicted in FIG. 1 as datastores, with each computing device or system having a single datastore. However, other memory resource configurations are also possible.

Client device 110 can be any computing device configured for requesting access to a protected resource and in the manner described herein. For example, client device 110 may be a desktop or laptop running an application through which the user supplies an authentication factor (e.g., a username and/or a password, or some other knowledge based factor) to the AM system 140.

Applications 120 can include one or more client applications (e.g., a Web or mobile application) that are configured to request access to resources hosted by data center 180. Access requests can be directly initiated by a user of client device 110 (e.g., via an explicit request made to an application 120) or indirectly triggered in response to user interaction with an application 120. In certain embodiments, the applications 120 include a Web browser (not shown) operable to request access to a resource identified according to a URL and/or operable to transmit a user supplied credential for verification by the AM system 140. The browser and/or other applications 120 may communicate with an application running on a remote computing system (e.g., an application running in the data center 180 or an application running in an external application system). The communication may include presenting, as part of an access request, an access token (e.g., an access token 132) for validation by one or more processors of the data center 180 or other remote computing system.

Client device 110 may further include, or may be communicatively coupled to, one or more datastores 130 that store the access token 132 and a session cookie 134. The access token 132 may be stored in an encrypted format and may be generated by the AM system 140 for a specific application and/or for a specific username. In certain embodiments, the access token 132 is generated in response to successful authorization, performed by AM system 140, in accordance with the OAuth 2 protocol. Session cookie 134 can also be stored encrypted and may comprise information about a session created for the user of the client device 110 (e.g., a session identifier (ID), a user ID, an identifier of an access management server that created the session, a session expiration time, etc.). In certain embodiments, session cookie 134 is an SSO cookie that provides single sign-on access to resources hosted by different computer systems (e.g., different data centers 180) within network environment 100.

Applications executed within the network environment 100 may use one or more resources. These resources may be distributed and virtualized within network environment 100. For example, the resources may be spread across one or more data centers 180 and can include protected resources (e.g., protected resources 184) and unprotected resources (not shown). While only one data center 180 is depicted in FIG. 1 for purposes of simplicity, a typical distributed environment includes multiple data centers distributed in network environment 100, possibly at different geographical locations. Each data center may comprise multiple types of resources. Use of and access to these resources may be managed by one or more virtual machines executed by the data centers. In some embodiments, the data center 180 is a cloud based data center that provides on-demand access to resources. The configuration of data center 180 depicted in FIG. 1 is just an example and is not intended to be limiting.

Each data center 180 may include one or more computer systems (e.g., a resource server) that operate as token validation endpoints for the client applications 120. The data center(s) 180 may, in response to receiving an access token from a client application in connection with an access request, validate the access token. The token validation may involve, for example, checking whether the access token includes a digital signature of a token issuing authority (e.g., AM server 160) and whether the access token is valid. Although rules can be enforced by a client application (e.g., an application 120 running on client device 110), the data center 180 can also be configured to determine and enforce rules based on rule information contained in an access token. Thus, rules can be enforced by any token receiving entity including, for example, a client application, a WebGate, a resource server of a data center, or a combination thereof.

AM system 140 may include one or more computing devices configured to perform authentication and authorization for a user of the client device 110. For example, AM system 140 may include an AM server 160 configured to authenticate a user by comparing one or more user supplied credentials to stored user information 172. In some embodiments, AM server 160 is a server running Oracle Access Manager (OAM) software. The AM server 160 may also be configured as an OAuth server that applies authorization policies 174 to generate access tokens for client applications. In some embodiments, authentication and authorization can be performed by separate servers of the AM system 140, i.e., authentication and authorization need not be performed by the same entity.

AM server 160 may create a session for a user in response to a successful authentication based on one or more user supplied credentials. Session creation may comprise generating session information (e.g., generating a session ID, determining a session validity period, etc.) and associating the session with the user (e.g., by linking the session ID to a user ID, which can be a user credential such as a username). Session creation may further comprise setting one or more cookies (e.g., session cookie 134) on the client device 110 for the user session.

AM server 160 may generate an access token in response to successful authorization based on applying an authorization policy (e.g., an authorization policy that has been configured for a resource being accessed). Authorization may require that the user be authenticated and/or that a session have been created, if not already done so by the time the AM server 160 receives an access token request that identifies the user.

AM system 140 may include a WebGate (WG) 150. In certain embodiments, WG 150 may be configured as an SSO agent that intercepts access requests from the client device 110 and redirects the access requests to an appropriate data center 180. In certain embodiments, WG 150 may be configured to execute a client application on behalf of client device 110. In that case, the WG 150 may receive an access token (e.g., directly from the AM system 140 or forwarded from the client device 110) and may enforce rules based on rule information in the access token, for example, in connection with requests from the client application to a Web application running in data center 180. Thus, the rule enforcement functionality described herein with respect to a client application running on a client device can also be implemented on a WebGate or other token receiving entity.

Figure 2:
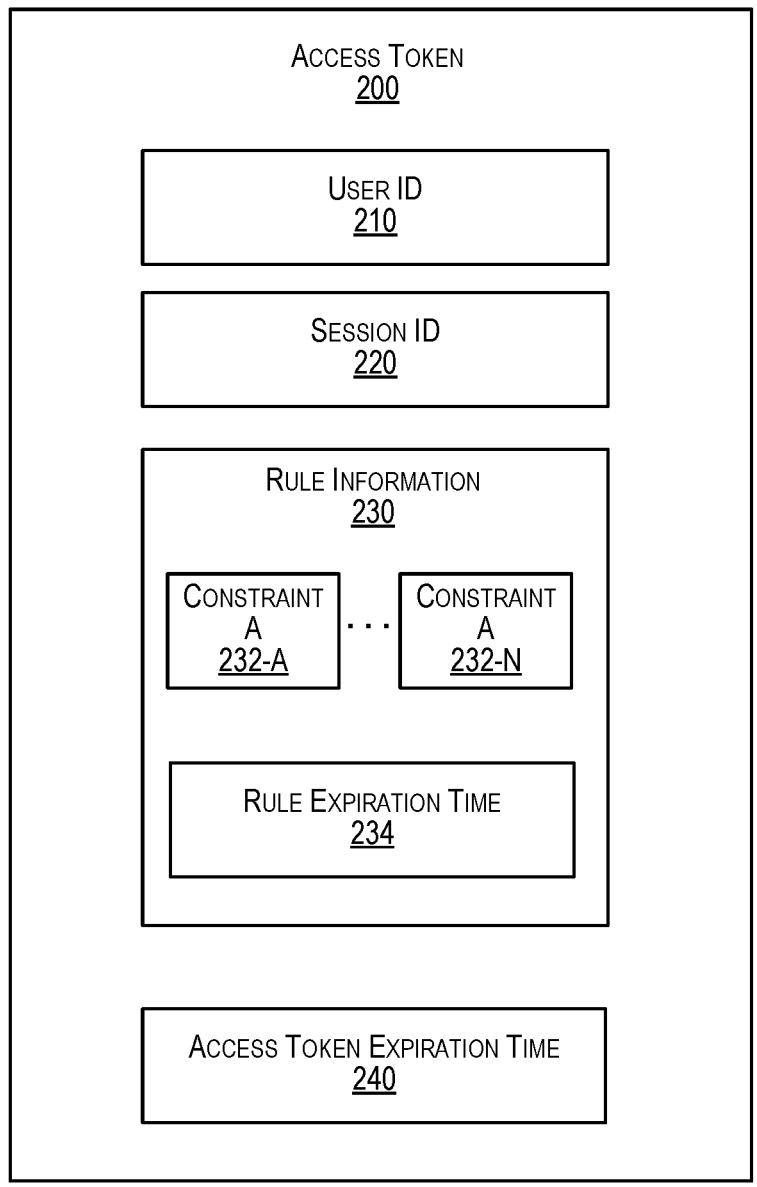
FIG. 2 is a simplified block diagram showing contents of an access token, according to certain embodiments.

FIG. 2 is a simplified block diagram showing contents of an access token 200, according to certain embodiments. Access token 200 may be issued for a particular set of scopes. For example, access token 200 may be configured with information which enables access token 200 to be presented for accessing some, but not all of the resources in the data center(s) 180. As depicted, access token 200 may include a user ID 210, a session ID 220, rule information 230, and an access token expiration time 240. The access token 200 can be a token created for a particular user (identified by user ID 210) and for a particular session (identified by session ID 220).

Rule information 230 may include one or more constraints 232 and a rule expiration time 234. Each constraint 232 may correspond to a condition for granting or denying access to a resource. For example, as described below in connection with FIG. 3, conditions can be based on the identity of the user, time, user location, Internet Protocol (IP) address, and/or other attributes (e.g., attributes of the user, client application, or client device). Rules can be configured for a particular resource or set of resources. For example, each data center 180 may have its own set of rules. Rules can also be configured for users or user groups. For example, different rules may be applied for the same resource depending on the identity of the user. The constraints 232 can be parsed to generate corresponding rules for determining whether to grant or deny access. While each condition may be treated as a self-contained rule, the conditions are usually evaluated together to make an access decision. Accordingly, the set of all conditions corresponding to the constraints 232 can be viewed as forming an overall rule (e.g., the "authz_rule" in FIG. 3).

Rule expiration time 234 may indicate a particular time at which the constraints, and thus the rule(s) represented by the constraints, are no longer valid. Similarly, access token expiration time 240 may indicate a particular time at which the access token 200 is no longer valid. Rule expiration time 234 applies to all of the constraints 232. However, in some embodiments, the access token 200 may include separate expiration times for individual constraints. The expiration times 234 and 240 can be specified, for example, as time durations (e.g., X number of seconds). Alternatively, the expiration times 234 and 240 can be specified as a particular time on a particular date. Other expiration formats are also possible. In certain embodiments, the access token 200 is configured with the rule expiration time 234 being shorter than the access token expiration time 240, i.e., the rules corresponding to the constraints 232 may expire before the access token 200 expires. As described below in connection with the method of FIG. 6, when either the rules expire or the access token itself expires, a new access token may be requested. A rule expiration time that is shorter than an access token expiration time may be useful when the rules are frequently updated.

FIG. 3 shows example rule information 300 that can be added to an access token, according to certain embodiments. The rule information 300 may be added to a field within an access token (e.g., access token 200). As depicted, the field may include the name of a corresponding rule, e.g., "authz_rule". The constraints may include a temporal constraint 310, a location constraint 320, a user constraint 330, and IP constraints 332 and 334. Additionally, the rule information 300 may include an expiration time 340 corresponding to the rule expiration time 234 in FIG. 2.

In the example of FIG. 3, the temporal constraint 310 is a positive constraint that allows access when the time of day is between 06:00 and 18:00. Similarly, a negative temporal constraint can be defined for denying access at certain times. It will be understood that any condition represented by a positive constraint can be represented using an equivalent negative constraint and vice versa.

Location constraint 320 permits access when the location of the client device from which an access request is being sent is in India, the United States, or China. Thus, it is implied that access should be denied if the user/client device is not in one of these three locations.

User constraint 330 permits access when the user is a member of an "hr" group.

IP constraint 332 prevents access when the IP address of the client device lies within the range 10.0.9.* to 10.1.1.*, where the asterisk symbol is a wildcard character that represents one or more numerical values. Similarly, IP constraint 334 allows access when the IP address of the client device is within a range defined by "*". Since no values have been specified for this range, the IP constraint 334 permits access for all IP addresses by default. The inclusion of IP constraint 332 limits this default access. Thus, constraints may interact with each other to define a specific set of conditions for granting or denying access.

Figure 4:
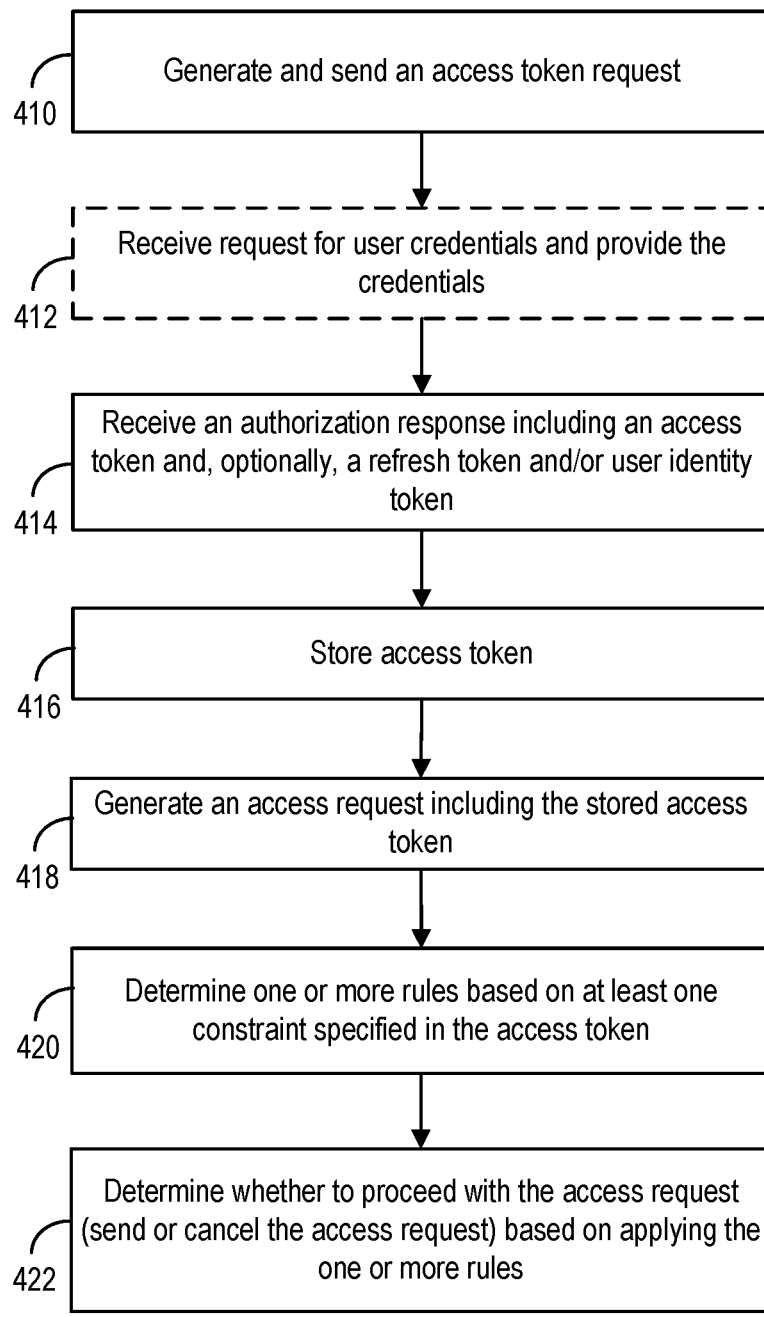
FIG. 4 is a simplified flowchart depicting a method for obtaining an access token, according to certain embodiments.
Figure 5:
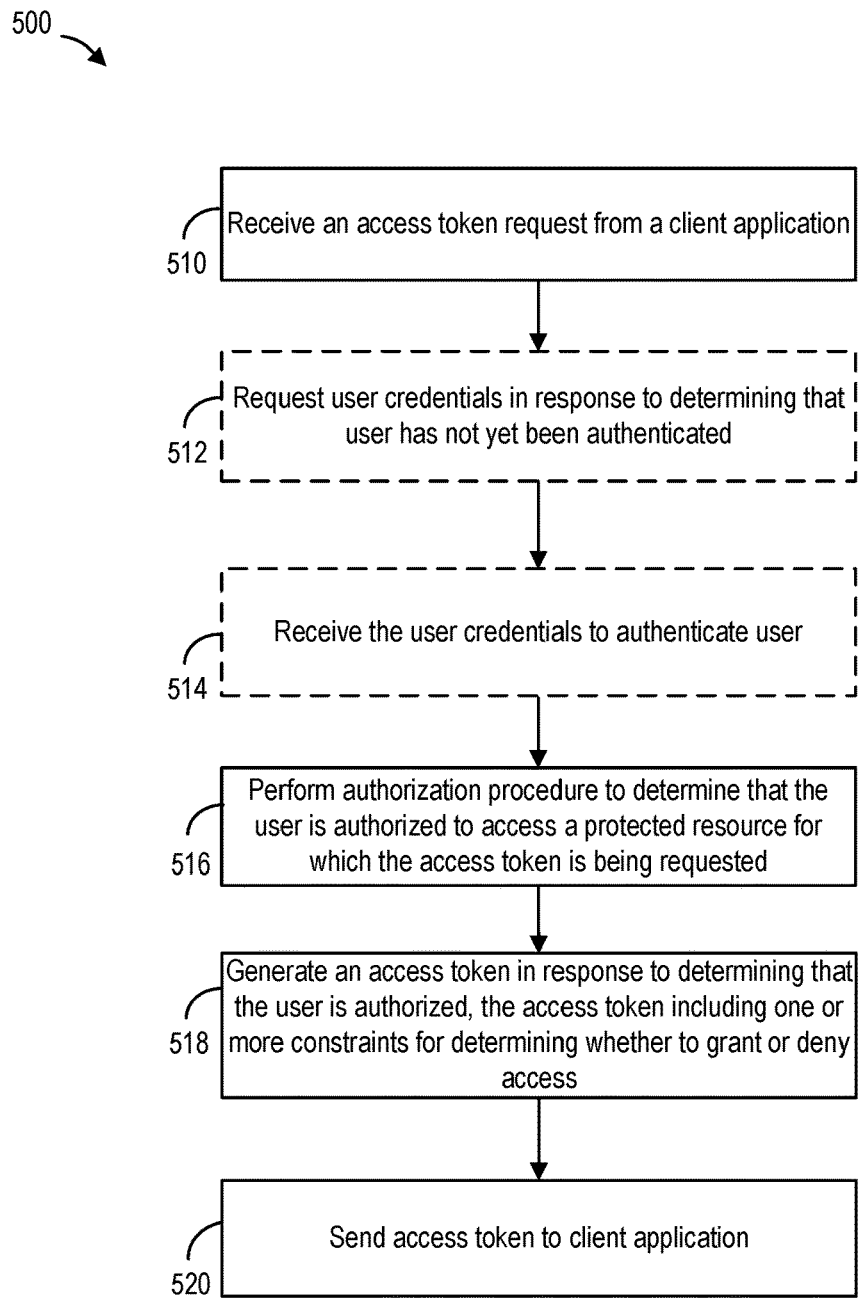
FIG. 5 is a simplified flowchart depicting a method for generating an access token, according to certain embodiments.
Figure 6:
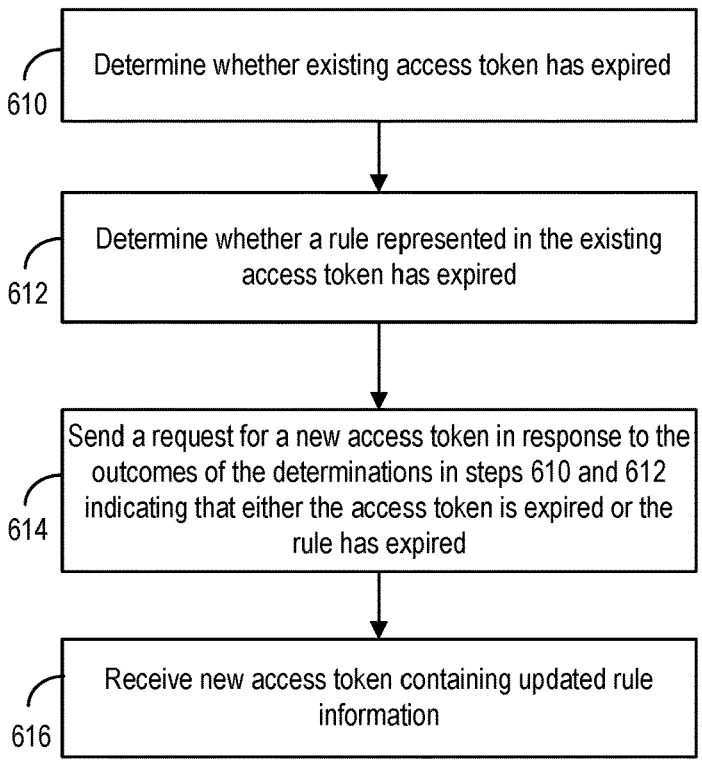
FIG. 6 is a simplified flowchart depicting a method for obtaining a new access token, according to certain embodiments.

Example flowcharts and process diagrams depicting processing performed during handling of an access request will now be described in connection with FIGS. 4 to 6. The processing depicted in FIGS. 4 to 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processes and methods presented in FIGS. 4 to 6 and described below are intended to be illustrative and non-limiting. Although FIGS. 4 to 6 depict various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 1, the processing depicted in FIGS. 4 to 6 may be performed by one or more components of an AM system (e.g., an application 120 and/or AM server 160).

FIG. 3 is merely an example of constraint-based rules. Rules can be modified to add, remove, or replace existing constraints. Thus, rules can be extended by the AM system such that the rules are not restricted to any particular set of constraints. For instance, the temporal constraint 310 could be updated to include additional constraints that specify a day of the week and/or a particular month of the year. As another example, the user constraint 330 could be modified to define allowed and/or disallowed groups (e.g., "allowed: ["hr", "finance"] would allow access by users belonging to a human resources or finance group, and "disallowed: ["admin"] would deny access by users belonging to an administrator group).

FIG. 4 is a simplified flowchart depicting a method 400 for obtaining an access token, according to certain embodiments. The processing depicted in FIG. 4 can be performed by a client application (e.g., application 120).

At step 410, the client application generates and sends an access token request (e.g., to AM system 140). The access token request may identify a resource to be accessed and a user (e.g., by username or user ID) for whom the access token is to be generated. The access token request may be generated in response to the client application determining that an access token is needed in order for an access request to be generated for a particular resource. For example, the client application may be aware that the resource is a protected resource and that the client application has not yet received an access token for accessing the protected resource. Accordingly, the client application may request that an access token be generated. This enables the client application to enforce one or more rules prior to sending (or possibly canceling) the access request in step 422. As another example, the client application may be redirected from the data center 180 to the AM system 140 for obtaining an access token, after sending an access request to the data center 180 and in response to the data center 180 determining that the client application does not have the required access token. Therefore, the generating of the access token request in step 410 can be in response to a determination by the client application (or some other entity such as a resource host) that an access token is needed for accessing a particular resource.

At step 412, the client application may receive a request for user credentials (e.g., a username and password) and may provide the requested credentials in response to the request. For example, assuming that the user has not yet been authenticated, AM system 140 may send a request for a username and/or password in order to authenticate the user and create a session for the user. If the user has already been authenticated, step 412 can be omitted.

At step 414, the client application receives an authorization response including an access token (e.g., access token 200). The response may optionally include a refresh token and/or a user identity token, either of which can be used to regenerate the access token when the access token or the rules represented in the access token expire.

At step 416, the client application stores the access token, along with any other tokens that were received in step 414. The access token can, for example, be stored in a memory space allocated on the client device 110 for use by the client application.

At step 418, the client application generates an access request that includes the access token. For example, the access token may be included in a header of the access request.

At step 420, the client application determines one or more rules based on at least one constraint specified in the access token. The rules can be determined by parsing the access token to extract rule information (e.g., rule information 300). In certain embodiments, an access token may include multiple sets of rule information. For example, an access token can include information for a first rule comprising a first set of one or more conditions, along with information for a second rule comprising a second set of one or more conditions. The determination of the rules can be performed concurrently with generating the access request in 418.

At step 422, the client application determines whether to proceed with the access request based on applying the one or more rules that were determined in step 420. Depending on the outcome of the determination, the client application sends or cancels the access request. For example, the access request may be sent to a resource host (e.g., data center 180) in response to the client application determining that all of the conditions for granting access are met with respect to at least one of the rules (e.g., the "authz_rule" in FIG. 3). Similarly, the access request may be canceled in response to the client application determining that, for every rule, at least one condition for granting access is unmet or that at least one condition for denying access is met. In this manner, the client application enforces the rule(s) without having to make a backchannel request to the AM system in connection with the access request in step 418.

In the example of FIG. 4, the client application reads the constraints from the access token to apply the one or more rules. However, the processing of the constraints and the enforcement of the rule(s) can be performed by any token receiving entity (e.g., a WebGate) in connection with an access request to be sent from or on behalf of a client application. In some embodiments, the client application may send the access token to a resource host as part of an access request, and the resource host parses the access token to apply the rule(s) and determine whether to grant or deny the access request.

FIG. 5 is a simplified flowchart depicting a method 500 for generating an access token, according to certain embodiments. The processing depicted in FIG. 5 can be performed by one or more components of an AM system (e.g., AM server 160).

At step 510, the AM system receives an access token request from a client application.

At step 512, the AM system may request user credentials in response to determining that the user has not yet been authenticated. For example, the access token request may identify a username, and AM server 160 may determine that a session has not yet been created for the identified username, which implies that the user has not been authenticated.

At step 514, the AM system may receive the requested user credentials to authenticate the user, e.g., by comparing the received credentials to stored user information such as the user information 172 in FIG. 1.

At step 516, the AM system performs an authorization procedure to determine that the user is authorized to access a protected resource for which the access token is being requested. The access token request may indicate that the access token is being requested for a defined set of scopes. For example, the client application may be requesting an access token that enables read-write access to a particular resource hosted by data center 180 and for a particular username. The AM system may retrieve an applicable authorization policy (e.g., the authorization policy 174, which may be associated with the resource that is the subject of the access token request). The AM system may then apply the authorization policy to determine whether the user identified in the access token request is authorized to access the protected resource. If the AM system determines that the user is not authorized, then no access token is generated. Otherwise, the method proceeds to step 518.

At step 518, the AM system generates an access token in response to a determination in step 516 that the user is authorized. The access token includes one or more constraints for determining whether to grant or deny access. The constraints may correspond to conditions in one or more rules that have been configured for the protected resource. In certain embodiments, the rules are stored by the AM system as part of an authorization policy configured for the protected resource, e.g., the same authorization policy that was applied in step 516. The authorization policy may be configured by an administrator of the AM system or by a resource owner/host (e.g., an operator of data center 180).

At step 520, the AM system sends the access token to the client application. The access token can then be presented to the host of the protected resource as part of an access request (e.g., the access request in step 418 of FIG. 4).

FIG. 6 is a simplified flowchart depicting a method 600 for obtaining a new access token, according to certain embodiments. The processing depicted in FIG. 6 can be performed by a client application (e.g., application 120) and assumes that there is an existing access token that has been generated for the client application.

At step 610, the client application determines whether the existing access token has expired. This determination can be based on a comparison of a token expiration time (e.g., access token expiration time 240 in FIG. 2) to a current time or to a time that has elapsed since the existing access token was issued.

At step 612, the client application determines whether a rule represented in the existing access token has expired. If the access token contains information for multiple rules, this can be based on determining that at least one of the rules has expired. The client application may be configured to periodically perform the determinations in steps 610 and 612. Alternatively or additionally, the determinations in steps 610 and 612 can be performed in connection with sending an access request to a resource host. For example, each time the client application is preparing to send an access request to data center 180, the client application may check whether the client application has received an access token applicable to the access request and, if so, whether the access token or the rules represented in the access token are expired.

At step 614, the client application sends a request for a new access token in response to the outcomes of the determinations in steps 610 and 612 indicating that either the access token is expired or the rule has expired. The request can be sent in various ways. For example, if the client application has a valid refresh token (e.g., a refresh token that has not yet expired), the client application may present the refresh token to the AM server 160 for refreshing the existing access token. Similarly, if the client application has a valid user identity token (e.g., a JWT containing a user ID as an assertion), the client application may present the user identity token for requesting a new access token as part of a JWT authorization grant flow. If the client application does not have either a refresh or user identity token, or if the refresh/user identity token is expired, the client application can initiate a three-legged flow, e.g., by contacting the AM server 160 via a Web browser, in which case the AM server 160 may request that the user provide, via input to the Web browser, user credentials for re-authenticating the user.

At step 616, the client application receives a new access token containing updated rule information. The access token is "new" in the sense that the access token replaces the existing access token. However, the new access token can contain at least some of the same information as the existing access token. In the example of FIG. 6, the rule information has been updated by the AM system (e.g., in response to modification of an authorization policy) so that the new access token contains constraints that are different from those contained in the existing access token, for example, one or more additional constraints. In this manner, the updated rules can be propagated via the client application "pulling" the rules in connection with a request for a new access token. However, it is also possible for the AM system to "push" the new access token to the client application without an explicit request from the client application.

Figure 7:
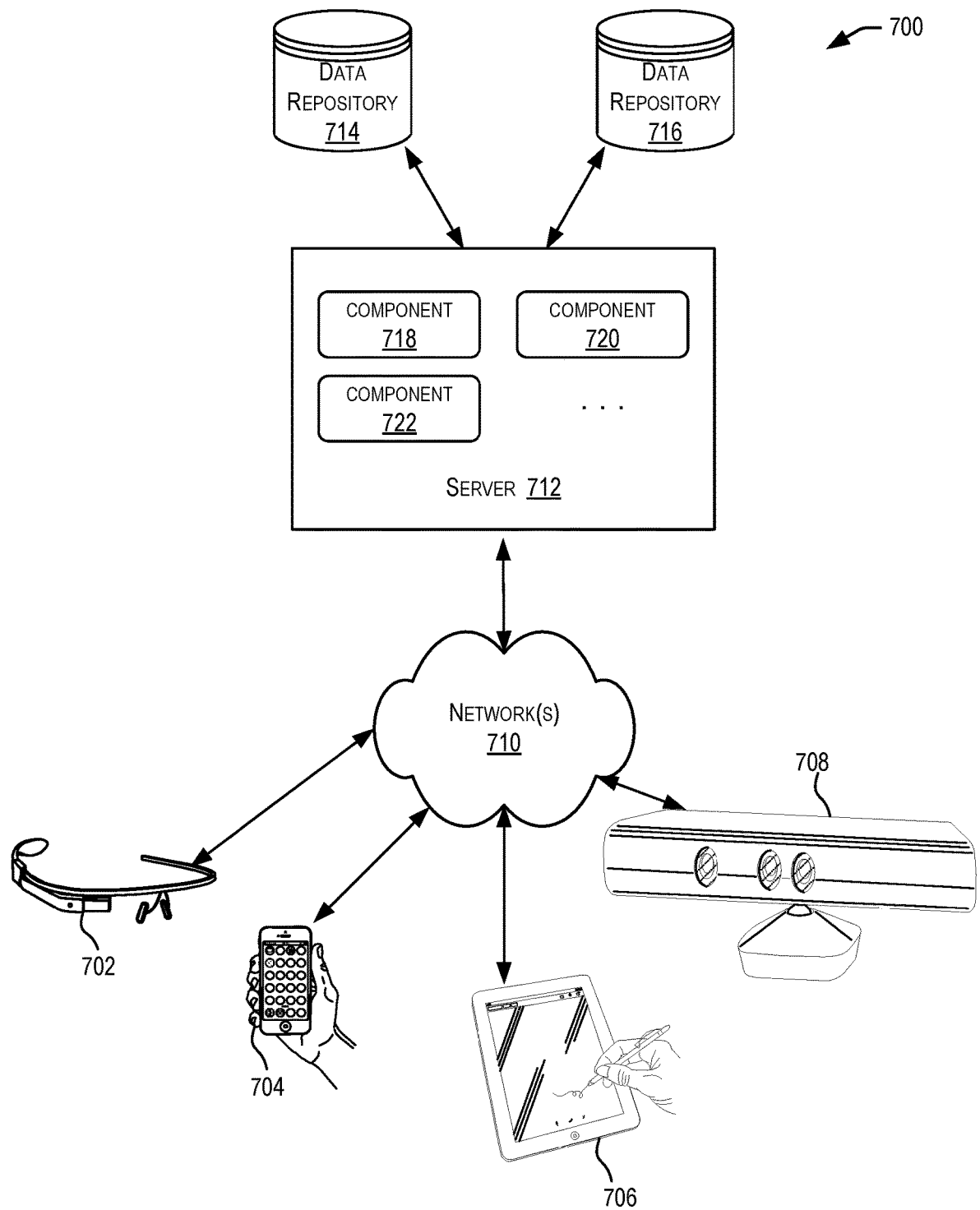
FIG. 7 is a simplified diagram of a distributed system for implementing one or more embodiments.

FIG. 7 depicts a simplified diagram of a distributed system 700 for implementing one or more embodiments. In the illustrated embodiment, distributed system 700 includes one or more client computing devices 702, 704, 706, and 708, coupled to a server 712 via one or more communication networks 710. Clients computing devices 702, 704, 706, and 708 may be configured to execute one or more applications.

In various embodiments, server 712 may be adapted to run one or more services or software applications that enable generation of an access token comprising rule information.

In certain embodiments, server 712 may also provide other services or software applications that can include non-virtual and virtual environments. In some embodiments, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, and/or 708 to request and use access tokens in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 710 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the IEEE 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization such as one or more flexible pools of logical storage devices that can be virtualized to maintain virtual storage devices for the server. In various embodiments, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain embodiments. For example, one or more of the data repositories 714, 716 may be used to store access tokens and/or rule information. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain embodiments, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 714, 716 may also be used by applications to store application data. The data repositories used by applications may be of different types such as, for example, a key-value store repository, an object store repository, or a general storage repository supported by a file system.

Figure 8:
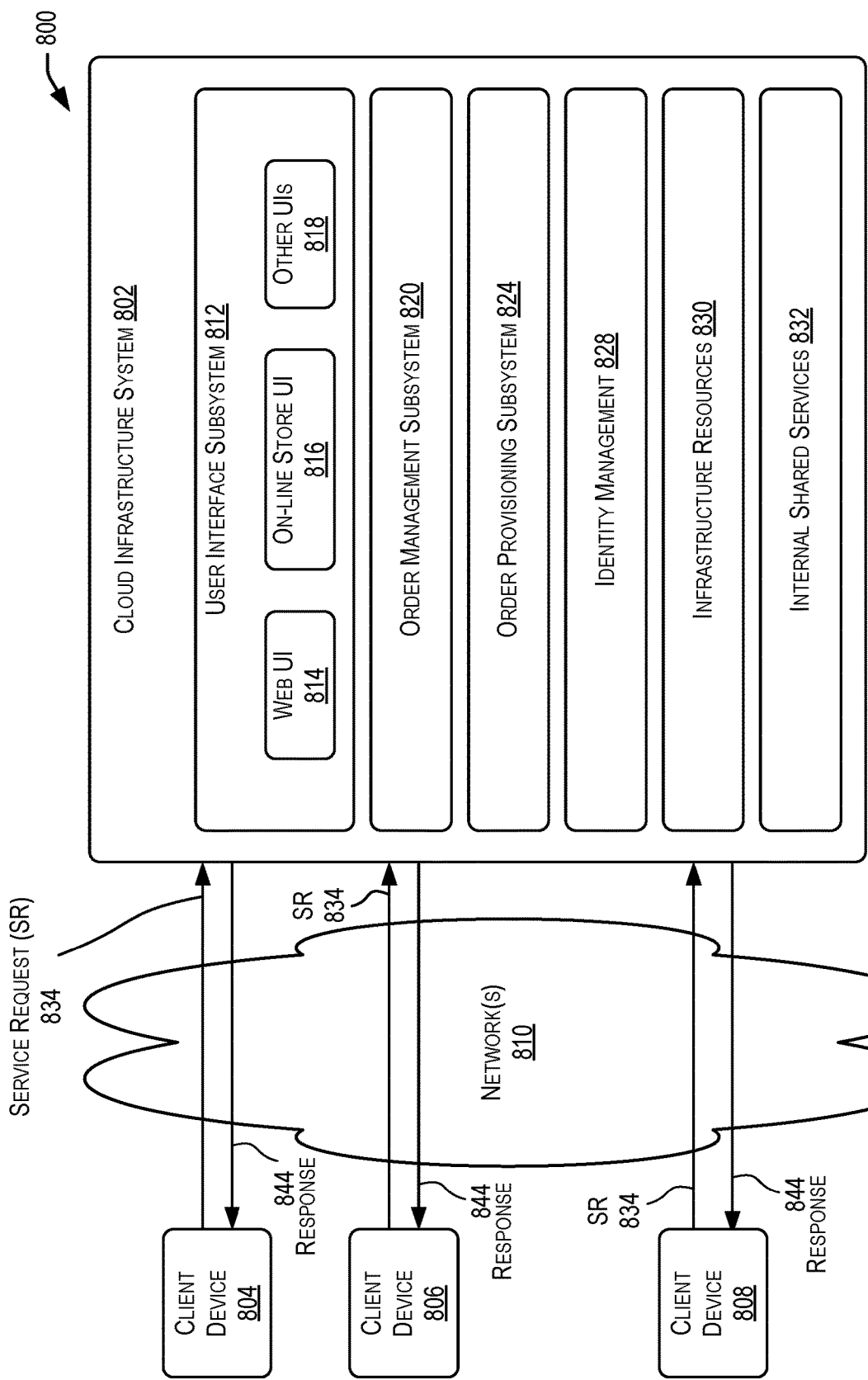
FIG. 8 is a simplified block diagram of a cloud-based system environment in which various authorization-related services may be offered as cloud services, in accordance with certain embodiments.

In certain embodiments, the authorization-related functionalities described in this disclosure may be offered as services via a cloud environment. FIG. 8 is a simplified block diagram of a cloud-based system environment in which various authorization-related services may be offered as cloud services, in accordance with certain embodiments. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other embodiments, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative embodiments.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. For example, a subscription order can be made to register one or more applications for receiving access tokens comprising rule information. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer can be an individual or an enterprise. In certain other embodiments, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request an authorization-related service described in this disclosure.

In some embodiments, the processing performed by cloud infrastructure system 802 for providing authorization-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 802 for determining constraints or other rule information (e.g., rule expiration time) for inclusion in access tokens. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain embodiments, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to. For example, a customer may place a subscription order for an authorization-related service offered by cloud infrastructure system 802. As part of the order, the customer may provide information identifying one or more usernames and/or one or more applications for which rule-enhanced access tokens are to be generated.

In certain embodiments, such as the embodiment depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services. In certain embodiments, for a customer requesting the authorization-related service, the response may include a confirmation that an application has been successfully registered for receiving rule-enhanced access tokens.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain embodiments, cloud infrastructure system 802 comprises an identity management subsystem (IMS) 828 that is configured to manage customers information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
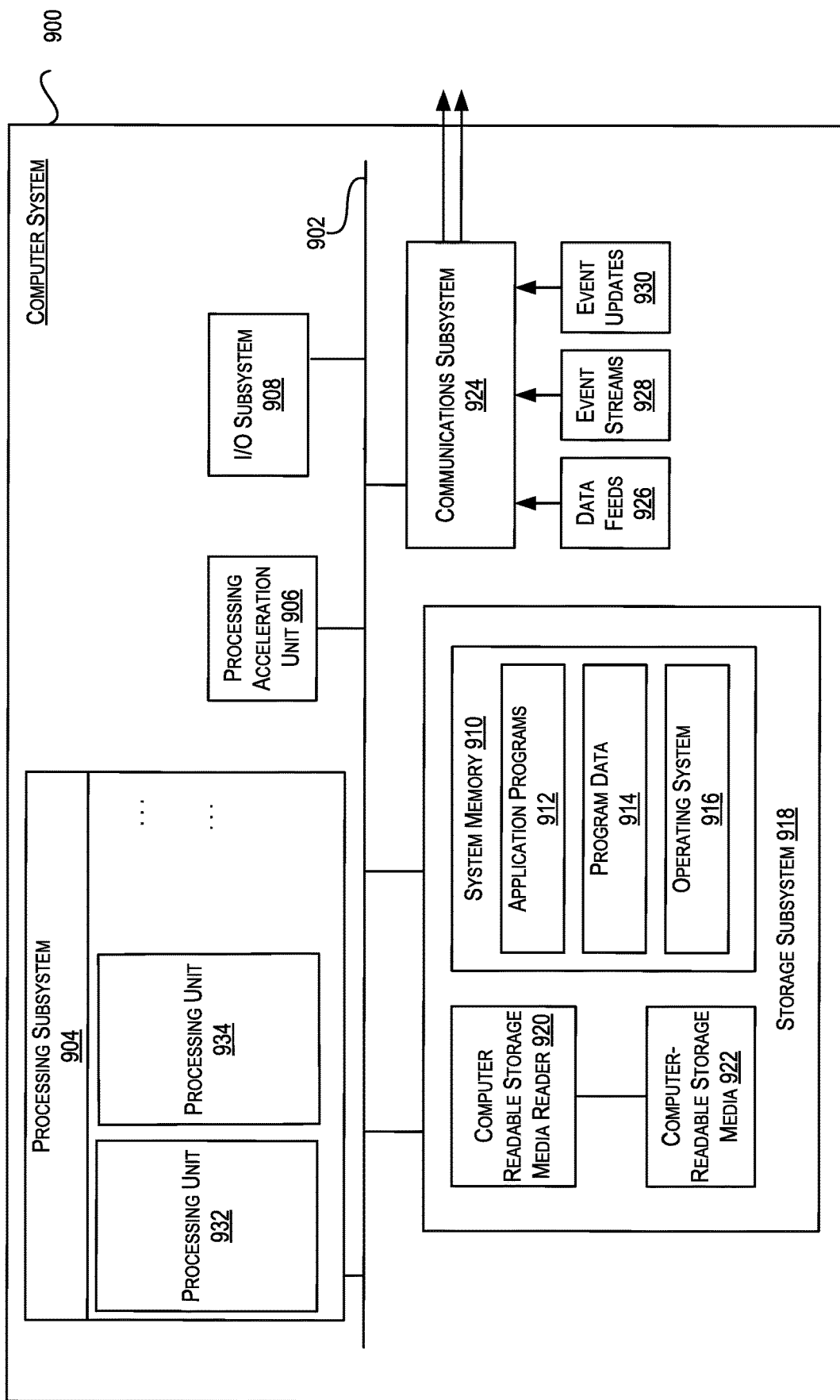
FIG. 9 illustrates an exemplary computer system that may be used to implement certain embodiments.

FIG. 9 illustrates an exemplary computer system 900 that may be used to implement certain embodiments. For example, in some embodiments, computer system 900 may be used to implement any of the client devices, data centers, access management systems and various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain embodiments, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some embodiments. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some embodiments. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 918 may also include a computer-readable storage media reader 920 that can further be connected to computer-readable storage media 922. Reader 920 may receive and be configured to read data from a memory device such as a disk, a flash drive, etc.

In certain embodiments, computer system 900 may support virtualization technologies, including but not limited to virtualization of processing and memory resources. For example, computer system 900 may provide support for executing one or more virtual machines. In certain embodiments, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, the communication subsystem may be used to send and receive access tokens.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including, but not limited to, conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method, comprising:
    receiving, by an access management system (AMS), an access token request from a client application at a client device, the access token request identifying a user of the client device and a resource to be accessed;
    authenticating, by the AMS, the user based on one or more user-supplied credentials prior to generating a first access token;
    determining, by the AMS, that the user of the client device is authorized to access the resource;
    generating, by the AMS, the first access token in response to the determining that the user of the client device is authorized to access the resource, wherein the first access token includes one or more constraints, each constraint corresponding to a condition for granting or denying user access to the resource, wherein the one or more constraints correspond to at least one of the following conditions: a time during which access is allowed, a time during which access is denied, a user or user group that is allowed access, a user or user group that is denied access, an Internet Protocol (IP) address that is allowed access, an IP address that is denied access, a geographic location that is allowed access, or a geographic location that is denied access; and
    sending, by the AMS, the first access token to the client application at the client device, wherein the first access token is presentable by the client application at the client device in an access request for obtaining access to the resource by the client application at the client device, and wherein the client application at the client device reads the one or more constraints from the first access token, the client application at the client device determines whether each condition for granting or denying user access to the resource is met according to the one or more constraints, the client application at the client device determines whether to proceed with the access request based on whether each condition for granting or denying user access to the resource is met, and, when the determination is to proceed with the access request, the client application at the client device presents the first access token in the access request to a resource host that hosts the resource, and the client application at the client device thereby obtains access to the resource.

2. The method of claim 1, wherein generating the first access token further comprises adding to the first access token information indicating an expiration time for a rule represented by the one or more constraints.

3. The method of claim 2, wherein generating the first access token further comprises adding to the first access token information indicating an expiration time for the first access token.

4. The method of claim 3, wherein the expiration time for the rule is different from the expiration time for the first access token.

5. The method of claim 1, further comprising:
    receiving, by the AMS, a request from the client application for a new access token presentable for obtaining access to the resource; and
    generating, by the AMS, a second access token in response to the request for a new access token, wherein the second access token includes at least one of an additional constraint not included in the first access token, a removal of a constraint included in the first access token, or a replacement for a constraint included in the first access token.

6. The method of claim 1, wherein the AMS determines that the user is authorized to access the resource based on an Open Authorization (OAuth) protocol.

7. The method of claim 1, wherein the client application at the client device generates the access request that includes the first access token in a header of the access request.

8. The method of claim 1, wherein the client application at the client device determines to proceed with the access request when each condition for granting user access to the resource is met, and wherein the client application at the client device enforces the conditions without a backchannel request to the AMS in connection with the access request.

9. A non-transitory computer-readable storage medium containing instructions that, when executed by one or more processors of an access management system (AMS), cause the one or more processors to perform processing comprising:

receiving an access token request from a client application at a client device, the access token request identifying a user of the client device and a resource to be accessed;

authenticating the user based on one or more user-supplied credentials prior to generating a first access token;

determining that the user of the client device is authorized to access the resource;

generating the first access token in response to the determining that the user of the client device is authorized to access the resource, wherein the first access token includes one or more constraints, each constraint corresponding to a condition for granting or denying user access to the resource, wherein the one or more constraints correspond to at least one of the following conditions: a time during which access is allowed, a time during which access is denied, a user or user group that is allowed access, a user or user group that is denied access, an Internet Protocol (IP) address that is allowed access, an IP address that is denied access, a geographic location that is allowed access, or a geographic location that is denied access; and sending the first access token to the client application at the client device, wherein the first access token is presentable by the client application at the client device in an access request for obtaining access to the resource by the client application at the client device, and wherein the client application at the client device reads the one or more constraints from the first access token, the client application at the client device determines whether each condition for granting or denying user access to the resource is met according to the one or more constraints, the client application at the client device determines whether to proceed with the access request based on whether each condition for granting or denying user access to the resource is met, and, when the determination is to proceed with the access request, the client application at the client device presents the first access token in the access request to a resource host that hosts the resource, and the client application at the client device thereby obtains access to the resource.

10. The non-transitory computer-readable storage medium of claim 9, wherein generating the first access token further comprises adding to the first access token information indicating an expiration time for a rule represented by the one or more constraints.

11. The non-transitory computer-readable storage medium of claim 10, wherein generating the first access token further comprises adding to the first access token information indicating an expiration time for the first access token.

12. The non-transitory computer-readable storage medium of claim 11, wherein the expiration time for the rule is different from the expiration time for the first access token.

13. The non-transitory computer-readable storage medium of claim 9, wherein the instructions further cause the one or more processors to perform processing comprising:

receiving a request from the client application for a new access token presentable for obtaining access to the resource; and generating a second access token in response to the request for a new access token, wherein the second access token includes at least one of an additional constraint not included in the first access token, a removal of a constraint included in the first access token, or a replacement for a constraint included in the first access token.

14. An access management system, comprising:

one or more processors; and a memory coupled to the one or more processors, the memory storing instructions that, when executed by the one or more processors, cause the one or more processors to perform processing comprising:

receiving an access token request from a client application at a client device, the access token request identifying a user of the client device and a resource to be accessed;

authenticating the user based on one or more user-supplied credentials prior to generating a first access token;

determining that the user of the client device is authorized to access the resource;

generating the first access token in response to the determining that the user of the client device is authorized to access the resource, wherein the first access token includes one or more constraints, each constraint corresponding to a condition for granting or denying user access to the resource, wherein the one or more constraints correspond to at least one of the following conditions: a time during which access is allowed, a time during which access is denied, a user or user group that is allowed access, a user or user group that is denied access, an Internet Protocol (IP) address that is allowed access, an IP address that is denied access, a geographic location that is allowed access, or a geographic location that is denied access; and sending the first access token to the client application at the client device, wherein the first access token is presentable by the client application at the client device in an access request for obtaining access to the resource by the client application at the client device, and wherein the client application at the client device reads the one or more constraints from the first access token, the client application at the client device determines whether each condition for granting or denying user access to the resource is met according to the one or more constraints, the client application at the client device determines whether to proceed with the access request based on whether each condition for granting or denying user access to the resource is met, and, when the determination is to proceed with the access request, the client application at the client device presents the first access token in the access request to a resource host that hosts the resource, and the client application at the client device thereby obtains access to the resource.

15. The access management system of claim 14, wherein generating the first access token further comprises:

adding to the first access token information indicating an expiration time for a rule represented by the one or more constraints; and adding to the first access token information indicating an expiration time for the first access token, wherein the expiration time for the rule is different from the expiration time for the first access token.

16. The access management system of claim 14, wherein the instructions further cause the one or more processors to perform processing comprising:
- receiving a request from the client application for a new access token presentable for obtaining access to the resource; and
- generating a second access token in response to the request for a new access token, wherein the second access token includes at least one of an additional constraint not included in the first access token, a removal of a constraint included in the first access token, or a replacement for a constraint included in the first access token.

\* \* \* \* \*

UNITED STATES PATENT AND TRADEMARK OFFICE
CERTIFICATE OF CORRECTION

PATENT NO. : 11,245,682 B2
APPLICATION NO. : 16/286366
DATED : February 8, 2022
INVENTOR(S) : Kukreja et al.

Page 1 of 1

It is certified that error appears in the above-identified patent and that said Letters Patent is hereby corrected as shown below:

On the Title Page

In Column 2, under (57) Abstract, Line 1, delete "Techniques for described for generating" and insert -- Techniques are described for generating --, therefor.

In the Specification

In Column 19, Line 66, delete "Google) Glass®)." and insert -- Google Glass®). --, therefor.

Signed and Sealed this
Thirty-first Day of May, 2022

Katherine Kelly Vidal
*Director of the United States Patent and Trademark Office*